(12) United States Patent
Nibarger et al.

(10) Patent No.: US 7,382,585 B1
(45) Date of Patent: Jun. 3, 2008

(54) MAGNETIC HEAD HAVING AMR READER, WRITER, AND GMR READER

(75) Inventors: John P. Nibarger, Superior, CO (US); Francis X. Campos, Louisville, CO (US); Larry E. Daby, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 403 days.

(21) Appl. No.: 11/241,343

(22) Filed: Sep. 30, 2005

(51) Int. Cl.
*G11B 5/33* (2006.01)
(52) U.S. Cl. .................................... 360/316
(58) Field of Classification Search ............... 360/314, 360/315, 316, 317, 31, 372.2; 324/207.26; 257/670; 428/811.2
See application file for complete search history.

(56) References Cited

U.S. PATENT DOCUMENTS

| | | | |
|---|---|---|---|
| 5,859,754 A * | 1/1999 | Tong et al. ............. | 360/314 |
| 5,920,446 A | 7/1999 | Gill | |
| 6,249,394 B1 * | 6/2001 | Li et al. .................. | 360/31 |
| 6,317,289 B1 | 11/2001 | Sasaki | |
| 6,392,853 B1 * | 5/2002 | Li et al. .................. | 428/811.2 |
| 6,583,971 B1 | 6/2003 | Shen et al. | |
| 6,984,878 B2 * | 1/2006 | Park et al. ............... | 257/670 |
| 2001/0029051 A1 | 10/2001 | Hyodo et al. | |
| 2003/0076635 A1 | 4/2003 | Morinaga et al. | |
| 2003/0103300 A1 | 6/2003 | Shen et al. | |
| 2003/0202294 A1 | 10/2003 | Terunuma | |
| 2004/0169966 A1 * | 9/2004 | Shen et al. ............. | 360/327.22 |
| 2005/0146323 A1 * | 7/2005 | Kleinen et al. ........ | 324/207.26 |

* cited by examiner

*Primary Examiner*—Tianjie Chen
(74) *Attorney, Agent, or Firm*—Brooks Kushman P.C.

(57) ABSTRACT

A magnetic head for writing data to and reading data from a magnetic recording medium includes an inductive-type writer, an anisotropic magneto-resistive (AMR) reader, and a giant magneto-resistive (GMR) reader. The AMR reader is used to read data from "high magnetic flux" recording mediums which have been recorded for use with AMR sensors. The GMR reader is used to read data from "low magnetic flux" recording mediums which have been recorded for use with GMR sensors. As such, the magnetic head provides for backward compatibility between the previously prevalent "high magnetic flux" recording mediums and the expected future prevalent "low magnetic flux" recording mediums. The magnetic head may be configured such that the writer and the AMR and GMR readers share sensor shields in various configurations in order to carry out their writing and reading functions.

19 Claims, 3 Drawing Sheets

MAGNETIC HEAD HAVING AMR READER, WRITER, AND GMR READER

BACKGROUND OF THE INVENTION

1. Field of the Invention

The present invention generally relates to a magnetic head having an inductive-type writer and a magneto-resistive (MR) reader with the writer and the reader being supported by a substrate in a stacked fashion. More particularly, the present invention relates to a magnetic head having an inductive-type writer, an anisotropic magneto-resistive (AMR) reader, and a giant magneto-resistive (GMR) reader with the writer, the AMR reader, and the GMR reader being supported by a substrate in a stacked fashion.

2. Background Art

Magnetic heads have writers to write data onto magnetic media such as magnetic tape or any other removable magnetic storage media. The writers generate magnetic flux for recording magnetic transitions into the media in order to write data onto the media. Magnetic heads have readers to read data from the media. The readers sense magnetic flux from the magnetic transitions recorded in the media in order to read data from the media.

Certain magnetic heads have an inductive-type writer and a magneto-resistive (MR) reader in which the writer and the reader are supported by a substrate in a stacked fashion. The reader is typically either an anisotropic magneto-resistive (AMR) reader or a giant magneto-resistive (GMR) reader. That is, some magnetic heads have an inductive-type writer and an AMR reader whereas other magnetic heads have an inductive-type writer and a GMR reader.

Compared with AMR readers, GMR readers are more sensitive and are tuned for thinner media with less magnetic flux which allows a higher linear recording density. As such, AMR readers are used to read data from higher flux media whereas GMR readers are used to read data from lower flux media capable of higher linear recording densities.

It is a problem when AMR readers are used to read data from lower flux media. This is a problem because AMR readers are not sensitive enough to read the lower flux media. Likewise, it is a problem when GMR readers are used to read data from higher flux media. This is a problem because GMR readers are too sensitive to read the higher flux media and become saturated when reading higher flux media.

In the past, the prevalent MR reader used in magnetic heads for tape applications was the AMR reader and the prevalent media was the higher flux media. In the future, it is expected that the prevalent MR reader to be used in magnetic heads for tape applications will be the GMR reader. Correspondingly, lower flux media capable of higher linear recording densities will be provided for use with the GMR reader.

As a result of the problems associated with AMR and GMR readers, backward compatibility between higher flux AMR readers optimized for lower recording densities and lower flux GMR readers optimized for higher recording densities is expected to be a problem. Backward compatibility is a problem because GMR readers are not able to read data from higher flux media which was prevalent in the past whereas AMR readers are not able to read data from lower flux media which is expected to be prevalent in the future.

SUMMARY OF THE INVENTION

Accordingly, it is an object of the present invention to provide a magnetic head that is able to read data from higher flux media tuned for anisotropic magneto-resistive (AMR) readers and that is able to read data from lower flux media tuned for giant magneto-resistive (GMR) readers.

It is another object of the present invention to provide a magnetic head having an AMR reader for reading data from "high flux" media and a GMR reader for reading data from "low flux" media such that the magnetic head is capable of reading data from both "high flux" and "low flux" media.

It is a further object of the present invention to provide a magnetic head having an inductive-type writer, an anisotropic magneto-resistive (AMR) reader, and a giant magneto-resistive (GMR) reader with the writer and the AMR and GMR readers being supported by a substrate in a stacked fashion.

It is still another object of the present invention to provide a magnetic head having a writer, an AMR reader, and a GMR reader which are all supported by a substrate in a stacked fashion with the writer being stacked between the AMR reader and the GMR reader.

It is still a further object of the present invention to provide a magnetic head having a writer, an AMR reader, and a GMR reader which are all supported by a substrate in a stacked fashion with the AMR reader and the GMR reader being stacked upon one another.

In carrying out the above objects and other objects, the present invention provides a magnetic head having a GMR reader and an AMR reader which are stacked on a substrate. In certain embodiments as described below, the magnetic head further includes an inductive-type writer which is stacked with the GMR reader and the AMR reader on the substrate.

In first and second embodiments, the AMR reader is stacked on the writer and the writer is stacked on the GMR reader.

In the first embodiment, the GMR reader includes a GMR sensor sandwiched between a GMR sensor bottom shield and a shared shield. The writer includes a write gap layer on the shared shield and includes a top pole on the write gap layer. The shared shield serves as a GMR sensor top shield and serves as a bottom pole for the writer. The AMR reader includes an AMR sensor sandwiched between an AMR sensor bottom shield and an AMR sensor top shield. An insulating gap layer separates the AMR sensor bottom shield from the top pole of the writer.

In the second embodiment, the GMR reader includes a GMR sensor sandwiched between a GMR sensor bottom shield and a shared shield. The shared shield includes a main body portion and a pedestal portion formed on top of the main body portion. The main body portion serves as a GMR sensor top shield. The writer includes a write gap layer on the pedestal portion and includes a top pole on the write gap layer. The pedestal portion serves as a bottom pole for the writer. The AMR reader includes an AMR sensor sandwiched between an AMR sensor bottom shield and an AMR sensor top shield. An insulating gap layer separates the AMR sensor bottom shield from the top pole of the writer.

In third and fourth embodiments, the writer is stacked on the GMR reader and the GMR reader is stacked on the AMR reader.

In the third embodiment, the AMR reader includes an AMR sensor sandwiched between an AMR sensor bottom shield and a shared AMR/GMR sensor shield. The shared AMR/GMR sensor shield serves as an AMR sensor top shield. The GMR reader includes a GMR sensor sandwiched between the shared AMR/GMR sensor shield and a shared shield. The shared AMR/GMR sensor shield serves as a GMR sensor bottom shield and the shared shield serves as a GMR sensor top shield. The writer includes a write gap layer on the shared shield and includes a top pole on the write gap layer. The shared shield serves as a bottom pole for the writer.

In the fourth embodiment, the AMR reader includes an AMR sensor sandwiched between an AMR sensor bottom shield and a shared AMR/GMR sensor shield. The shared AMR/GMR sensor shield serves as an AMR sensor top shield. The GMR reader includes a GMR sensor sandwiched between the shared AMR/GMR sensor shield and a shared shield. The shared shield has a main body portion and a pedestal portion formed on top of the main body portion. The main body portion serves as a GMR sensor top shield. The writer includes a write gap layer on the pedestal portion and includes a top pole on the write gap layer. The pedestal portion serves as a bottom pole for the writer.

In fifth and sixth embodiments, the GMR reader is stacked on the writer and the writer is stacked on the AMR reader.

In the fifth embodiment, the AMR reader includes an AMR sensor sandwiched between an AMR sensor bottom shield and a shared shield. The writer includes a write gap layer on the shared shield and includes a top pole on the write gap layer. The shared shield serves as an AMR sensor top shield and serves as a bottom pole for the writer. The GMR reader includes a GMR sensor sandwiched between a GMR sensor bottom shield and a GMR sensor top shield. An insulating gap layer separates the GMR sensor bottom shield from the top pole of the writer.

In the sixth embodiment, the AMR reader includes an AMR sensor sandwiched between an AMR sensor bottom shield and a shared shield. The shared shield includes a main body portion and a pedestal portion formed on top of the main body portion. The main body portion serves as an AMR sensor top shield. The writer includes a write gap layer on the pedestal portion and includes a top pole on the write gap layer. The pedestal portion serves as a bottom pole for the writer. The GMR reader includes a GMR sensor sandwiched between a GMR sensor bottom shield and a GMR sensor top shield. An insulating gap layer separates the GMR sensor bottom shield from the top pole of the writer.

In seventh and eighth embodiments, the writer is stacked on the AMR reader and the AMR reader is stacked on the GMR reader.

In the seventh embodiment, the GMR reader includes a GMR sensor sandwiched between a GMR sensor bottom shield and a shared GMR/AMR sensor shield. The shared GMR/AMR sensor shield serves as a GMR sensor top shield. The AMR reader includes an AMR sensor sandwiched between the shared GMR/AMR sensor shield and a shared shield. The shared GMR/AMR sensor shield serves as an AMR sensor bottom shield and the shared shield serves as an AMR sensor top shield. The writer includes a write gap layer on the shared shield and includes a top pole on the write gap layer. The shared shield serves as a bottom pole for the writer.

In the eighth embodiment, the GMR reader includes a GMR sensor sandwiched between a GMR sensor bottom shield and a shared GMR/AMR sensor shield. The shared GMR/AMR sensor shield serves as a GMR sensor top shield. The AMR reader includes an AMR sensor sandwiched between the shared GMR/AMR sensor shield and a shared shield. The shared shield has a main body portion and a pedestal portion formed on top of the main body portion. The main body portion serves as an AMR sensor top shield. The writer includes a write gap layer on the pedestal portion and includes a top pole on the write gap layer. The pedestal portion serves as a bottom pole for the writer.

In ninth and tenth embodiments, the AMR reader is stacked on the GMR reader and the GMR reader is stacked on the writer.

In the ninth embodiment, the writer includes a bottom pole separated by a write gap layer from a shared shield. The shared shield serves as a top pole for the writer. The GMR reader includes a GMR sensor sandwiched between the shared shield and a shared GMR/AMR sensor shield. The shared shield serves as a GMR sensor bottom shield and the shared GMR/AMR sensor shield serves as a GMR sensor top shield. The AMR reader includes an AMR sensor sandwiched between the shared GMR/AMR sensor shield and an AMR sensor top shield. The shared GMR/AMR sensor shield serves as an AMR sensor bottom shield.

In the tenth embodiment, the shared shield includes a main body portion which serves as the GMR sensor bottom shield and further includes a pedestal portion which serves as the top pole.

In variations of the ninth and tenth embodiments, the GMR reader is stacked on the AMR reader and the AMR reader is stacked on the writer.

In eleventh and twelfth embodiments, the magnetic head includes a GMR reader and an AMR reader which are stacked on a substrate but does not include a writer.

In the eleventh embodiment, the AMR reader is stacked on the GMR reader. The GMR reader includes a GMR sensor sandwiched between a GMR sensor bottom shield and a shared GMR/AMR shield. The shared GMR/AMR shield serves as a GMR sensor top shield. The AMR reader includes an AMR sensor sandwiched between the shared GMR/AMR shield and an AMR sensor top shield. The shared GMR/AMR shield serves as an AMR sensor bottom shield.

In the twelfth embodiment, the GMR reader is stacked on the AMR reader. The AMR reader includes an AMR sensor sandwiched between an AMR sensor bottom shield and a shared GMR/AMR shield. The shared GMR/AMR shield serves as an AMR sensor top shield. The GMR reader includes a GMR sensor sandwiched between the shared GMR/AMR shield and a GMR sensor top shield. The shared GMR/AMR shield serves as a GMR sensor bottom shield.

DETAILED DESCRIPTION OF THE PREFERRED EMBODIMENT(S)

Figure 1:
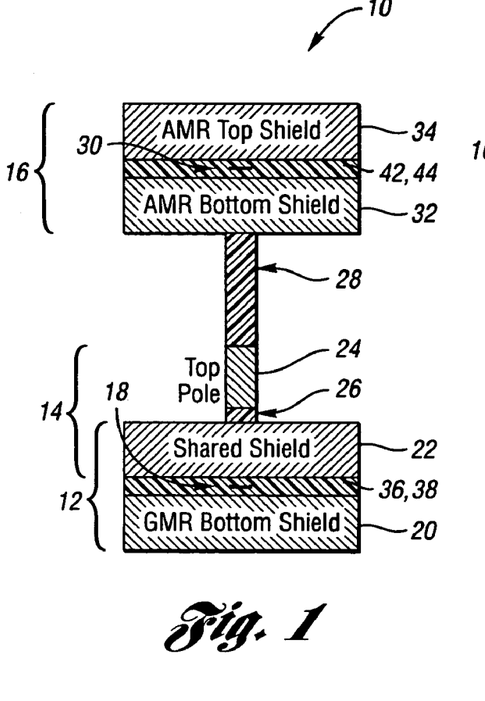
FIG. 1 illustrates a magnetic head in accordance with a first embodiment of the present invention.

Referring now to FIG. 1, a magnetic head 10 in accordance with a first embodiment of the present invention is shown. FIG. 1 illustrates a cross-sectional view of magnetic head 10 parallel to an air-bearing surface which faces a magnetic recording media such as a magnetic tape or any other removable magnetic storage media. Magnetic head 10 generally includes a giant magneto-resistive (GMR) reader 12, an inductive-type writer 14, and an anisotropic magneto-resistive (AMR) reader 16. GMR reader 12, writer 14, and AMR reader 16 are supported on a substrate (not shown) in a stacked fashion.

GMR reader 12, which is deposited on a substrate (not shown), generally includes a GMR sensor 18 sandwiched between a GMR bottom shield 20 and a shared shield 22. Shared shield 22 serves as the top shield for GMR sensor 18.

Writer 14, which is deposited on GMR reader 12, generally includes a top pole 24 separated at the air-bearing surface from shared shield 22 by a write gap layer 26. Shared shield 22 serves as the bottom pole for writer 14. Away from the air-bearing surface, top pole 24 and shared shield 22 are magnetically coupled to one another. This magnetic coupling allows a flux return path and enables writer 14 to write data onto the media.

AMR reader 16, which is deposited on an insulating gap layer 28 on writer 14, generally includes an AMR sensor 30 sandwiched between an AMR bottom shield 32 and an AMR top shield 34.

In a manufacturing method of magnetic head 10, the elements of GMR reader 12 are initially deposited on a substrate, followed by the deposition of the elements of writer 14 onto the GMR reader, followed by the deposition of the elements of AMR reader 16 onto the writer.

To form GMR reader 12, an insulating layer is deposited on a substrate (not shown). Next, a magnetic material is deposited on the insulating layer and formed into a GMR bottom shield 20. A shield gap film 36 is deposited on GMR bottom shield 20. A GMR film is formed on shield gap film 36 to form GMR sensor 18. Next, after forming a lead layer (not shown) as an extraction electrode which is electrically connected to GMR sensor 18, a shield gap film 38 is formed on the lead layer, shield gap film 36, and the GMR sensor. As such, GMR sensor 18 is buried between shield gap films 36, 38. Further, shared shield 22 made of a magnetic material is selectively formed on shield gap film 38. Shared shield 22 serves as a GMR top shield.

To form writer 14, as indicated above, shared shield 22 also serves as the bottom pole for writer 14. Next, write gap layer 26 is deposited on shared shield 22. Coils (not shown) are then formed on write gap layer 26 away from the air-bearing surface by, for example, electroplating. Away from the air-bearing surface write gap layer 26 is selectively etched to form a magnetic path between shared shield 22 and top pole 24.

Top pole 24 made of a magnetic material is then selectively formed on write gap layer 26 and the coils. Top pole 24 contacts shared shield 22 at a point away from the air-bearing surface are magnetically coupled to the shared shield. Top pole 24 has a width at the air-bearing surface which defines the width of a recording track in the media.

Prior to forming AMR reader 16, an insulating gap layer 28 is deposited over top pole 24. AMR reader 16 is then formed on insulating gap layer 28.

To form AMR reader 16, a magnetic material is deposited on insulating gap layer 28 to form AMR bottom shield 32. A shield gap film 42 is deposited on AMR bottom shield 32. An AMR film is formed on shield gap film 42 to form AMR sensor 30. Next, after forming a lead layer (not shown) as an extraction electrode which is electrically connected to AMR sensor 30, a shield gap film 44 is formed on the lead layer, shield gap film 42, and the AMR sensor. As such, AMR sensor 30 is buried between shield gap films 42, 44. Further, AMR top shield 34 made of a magnetic material is selectively formed on shield gap film 44.

GMR sensor 18, top pole 24 of writer 14, and AMR sensor 30 are vertically aligned with one another as shown in FIG. 1. This vertical alignment shown in FIG. 1 is by no means the only alignment possible. For example, in a helical process the writer and reader elements are offset from each other. Regardless of the geometrical alignment, GMR sensor 18 is capable of sensing "low flux" media while AMR sensor 30 is capable of sensing "high flux" media.

Figure 2:
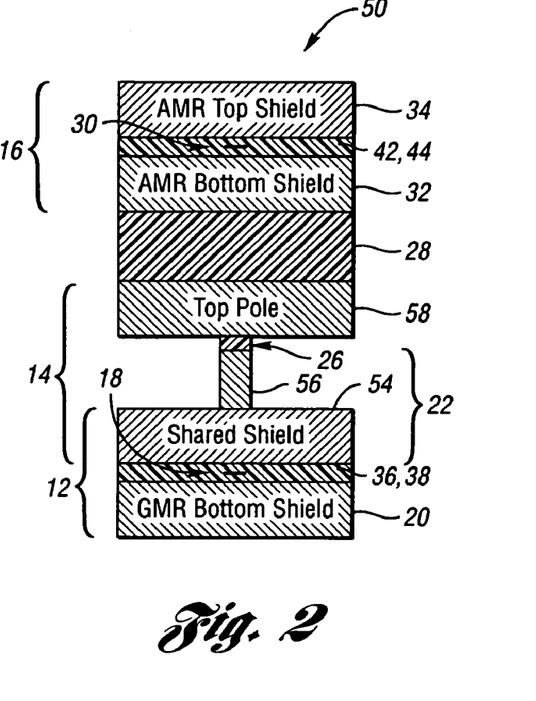
FIG. 2 illustrates a magnetic head in accordance with a second embodiment of the present invention.

Referring now to FIG. 2, with continual reference to FIG. 1, a magnetic head 50 in accordance with a second embodiment of the present invention is shown. FIG. 2 illustrates a cross-sectional view of magnetic head 50 parallel to an air-bearing surface which faces a media. Magnetic head 50 generally includes the same elements as magnetic head 10 and like elements have the same reference numerals in FIG. 2.

Magnetic head 50 differs from magnetic head 10 by having different shared shield and top pole configurations. Specifically, GMR reader 12 and writer 14 include a shared shield 22. Shared shield 22 includes a main body portion 54 and a pedestal portion 56. Main body portion 54 is identical to shared shield 22 of magnetic head 10 and serves as a top shield for GMR sensor 18. Pedestal portion 56 is formed on main body portion 54 and serves as a bottom pole for writer 14. Pedestal portion 56 has a width at the air-bearing surface which defines the recording track width in the media.

Writer 14 of magnetic head 50 includes a top pole 58. Top pole 58 is separated at the air-bearing surface from pedestal portion 56 by write gap layer 26. At the air-bearing surface, top pole 58 has a width on the order of the shield widths. As such, at the air-bearing surface, top pole 58 has a width greater than the width of pedestal portion 56. As a result, pedestal portion 56 and top pole 58 of writer 14 form an inverted writer. GMR sensor 18, bottom pole pedestal 56 of writer 14, and AMR sensor 30 are vertically aligned with one another as shown in FIG. 2 in order to read and write data in the manner described above with reference to FIG. 1. This vertical alignment shown in FIG. 2 is by no means the only alignment possible. For example, in a helical process the writer and reader elements are offset from each other.

Figure 3:
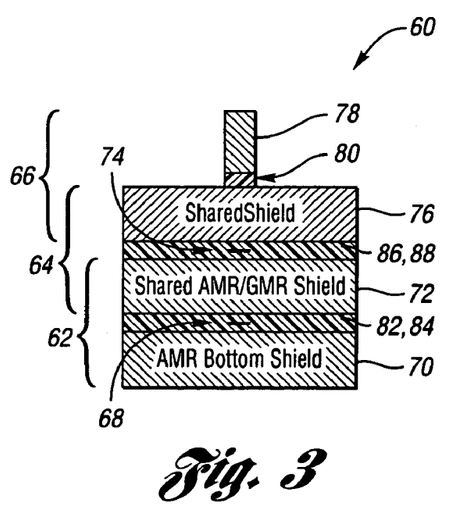
FIG. 3 illustrates a magnetic head in accordance with a third embodiment of the present invention.

Referring now to FIG. 3, a magnetic head 60 in accordance with a third embodiment of the present invention is shown. FIG. 3 illustrates a cross-sectional view of magnetic head 60 parallel to an air-bearing surface which faces the media. Magnetic head 60 generally includes an AMR reader 62, a GMR reader 64, and an inductive-type writer 66. AMR reader 62, GMR reader 64, and writer 66 are supported on a substrate (not shown) in a stacked fashion.

AMR reader 62, which is deposited on a substrate (not shown), generally includes an AMR sensor 68 sandwiched between an AMR bottom shield 70 and a shared AMR/GMR shield 72. Shared AMR/GMR shield 72 serves as the top shield for AMR sensor 68.

GMR reader 64, which is deposited on AMR reader 62, generally includes a GMR sensor 74 sandwiched between shared AMR/GMR shield 72 and a shared shield 76. Shared AMR/GMR shield 72 serves as the bottom shield for GMR sensor 74 and shared shield 76 serves as the top shield for the GMR sensor.

Writer 66, which is deposited on GMR reader 64, generally includes a top pole 78 separated at the air-bearing surface from shared shield 76 by a write gap layer 80. Shared shield 76 serves as the bottom pole for writer 66. Away from the air-bearing surface, top pole 78 and shared shield 76 contact each other in order to be magnetically coupled to one another for enabling writer 66 to write data onto the media.

In a manufacturing method of magnetic head 60, the elements of AMR reader 62 are initially deposited on a substrate, followed by the deposition of the elements of GMR reader 64 onto the AMR reader, followed by the deposition of the elements of writer 66 onto the GMR reader.

To form AMR reader 62, an insulating layer is deposited on a substrate (not shown). Next, a magnetic material is formed on the insulating layer to form AMR bottom shield 70. A shield gap film 82 is deposited on AMR bottom shield 70. An AMR film is formed on shield gap film 82 to form AMR sensor 68. Next, after forming a lead layer (not shown) as an extraction electrode which is electrically connected to AMR sensor 68, a shield gap film 84 is formed on the lead layer, shield gap film 82, and the AMR sensor. As such, AMR sensor 68 is buried between shield gap films 82, 84. Further, shared AMR/GMR shield 72 made of a magnetic material is selectively formed on shield gap film 84. Shared AMR/GMR shield 72 serves as an AMR top shield.

As indicated above, to form GMR reader 64, shared AMR/GMR shield 72 serves as a GMR bottom shield. A shield gap film 86 is then deposited on shared AMR/GMR shield 72. A GMR film is formed on shield gap film 86 to form GMR sensor 74. Next, after forming a lead layer (not shown) as an extraction electrode which is electrically connected to GMR sensor 74, a shield gap film 88 is formed on the lead layer, shield gap film 86, and the GMR sensor. As such, GMR sensor 74 is buried between shield gap films 86, 88. Further, a magnetic material is formed on shield gap film 88 to form shared shield 76. Shared shield 76 serves as a GMR top shield.

As indicated above, to form writer 66, shared shield 76 serves as the bottom pole for the writer. Write gap layer 80 is then deposited on shared shield 76. Coils (not shown) are then formed on write gap layer 80 away from the air-bearing surface. Write gap layer 80 is selectively etched away from the air-bearing surface to form a magnetic path between shared shield 76 and top pole 78.

Top pole 78 made of a magnetic material is then selectively formed on write gap layer 80 and the coils. Top pole 78 contacts shared shield 76 at a point away from the air-bearing surface to be magnetically coupled to the shared shield. Top pole 78 has a width at the air-bearing surface which defines the width of a recording track in the media.

AMR sensor 68, GMR sensor 74, and top pole 78 of writer 66 are vertically aligned with one another as shown in FIG. 3. This vertical alignment shown in FIG. 3 is by no means the only alignment possible. Again, for example, in a helical process the writer and reader elements are offset from each other.

Figure 4:
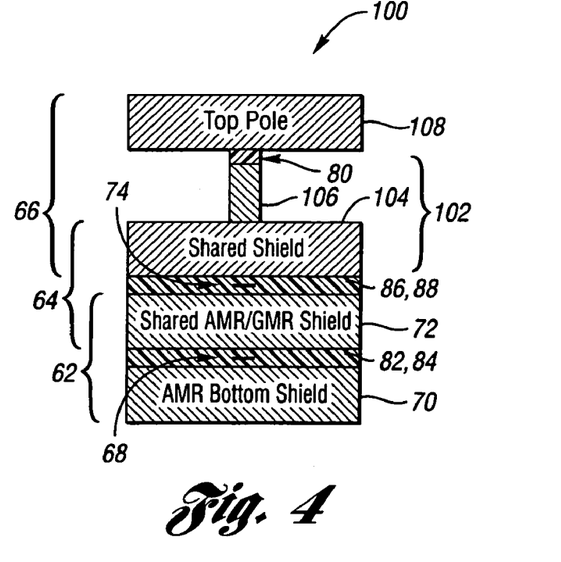
FIG. 4 illustrates a magnetic head in accordance with a fourth embodiment of the present invention.

Referring now to FIG. 4, with continual reference to FIGS. 2 and 3, a magnetic head 100 in accordance with a fourth embodiment of the present invention is shown. FIG. 4 illustrates a cross-sectional view of magnetic head 100 parallel to an air-bearing surface which faces a media. Magnetic head 100 generally includes the same elements as magnetic head 60 and like elements have the same reference numerals in FIG. 4.

Magnetic head 100 differs from magnetic head 60 by having different shared shield and top pole configurations. Specifically, GMR reader 64 and writer 66 include shared shield 102. Shared shield 102 includes a main body portion 104 and a pedestal portion 106. Main body portion 104 is identical to shared shield 76 of magnetic head 60 and serves as a top shield for GMR sensor 74. Pedestal portion 106 is formed on main body portion 104 and serves as a bottom pole for writer 66. Pedestal portion 106 has a width at the air-bearing surface which defines the recording track width in the media.

Writer 66 of magnetic head 100 includes a top pole 108. Top pole 108 is separated at the air-bearing surface from pedestal portion 106 by write gap layer 80. At the air-bearing surface, top pole 108 has a width on the order of the shield widths. As such, at the air-bearing surface, top pole 108 has a width greater than the width of pedestal portion 106. As a result, pedestal portion 106 and top pole 108 of writer 66 form an inverted writer. AMR sensor 68, GMR sensor 74, and bottom pole pedestal 106 of writer 66 are vertically aligned with one another as shown in FIG. 4 in order to read and write data in the manner described above with reference to FIG. 3. This vertical alignment shown in FIG. 4 is by no means the only alignment possible. For example, in a helical process the writer and reader elements are offset from each other.

FIGS. 5, 6, 7, and 8 illustrate additional embodiments of a magnetic head in accordance with the present invention. The magnetic head embodiments illustrated in FIGS. 5, 6, 7, and 8 correspond respectively to the magnetic head embodiments illustrated in FIGS. 1, 2, 3, and 4.

A general difference between the two sets of embodiments is that the AMR and GMR readers of the embodiments illustrated in FIGS. 5, 6, 7, and 8 are interchanged with respect to the AMR and GMR readers of the embodiments illustrated in FIGS. 1, 2, 3, and 4. The manufacturing methods for forming the magnetic head embodiments shown in FIGS. 5, 6, 7, and 8 is generally similar to the described manufacturing methods for forming the magnetic head embodiments shown in FIGS. 1, 2, 3, and 4.

Like FIGS. 1, 2, 3, and 4, FIGS. 5, 6, 7, and 8 also illustrate cross-sectional views of the magnetic head embodiments parallel to an air-bearing surface which faces the media. The manner in which the magnetic head embodiments illustrated in FIGS. 5, 6, 7, and 8 write and read data to and from media corresponds to the manner in which the magnetic head embodiments illustrated in FIGS. 1, 2, 3, and 4 write and read data to and from the media.

Figure 5:
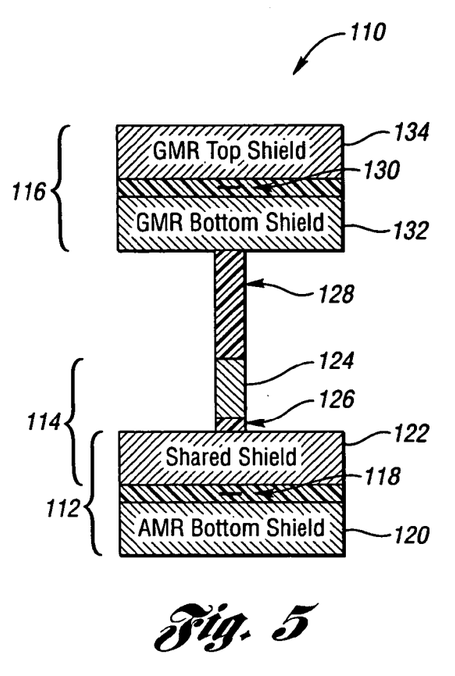
FIG. 5 illustrates a magnetic head in accordance with a fifth embodiment of the present invention.

Referring now to FIG. 5, with continual reference to FIG. 1, a magnetic head 110 in accordance with a fifth embodiment of the present invention is shown. Magnetic head 110 generally includes an AMR reader 112, an inductive-type writer 114, and a GMR reader 116.

AMR reader 112, which is deposited on a substrate (not shown), generally includes an AMR sensor 118 sandwiched between an AMR bottom shield 120 and a shared shield 122. AMR sensor 118 is buried within a shield film gap. Shared shield 122 serves as the top shield for AMR sensor 118. Writer 114, which is deposited on AMR reader 112, generally includes a top pole 124 separated at the air-bearing surface from shared shield 122 by a write gap layer 126.

Shared shield 122 serves as the bottom pole for writer 114. Away from the air-bearing surface, top pole 124 and shared shield 122 are magnetically coupled to one another. GMR reader 116, which is deposited on an insulating gap layer 128 on writer 114, generally includes a GMR sensor 130 sandwiched between a GMR bottom shield 132 and a GMR top shield 134. GMR sensor 130 is also buried within a shield film gap.

Figure 6:
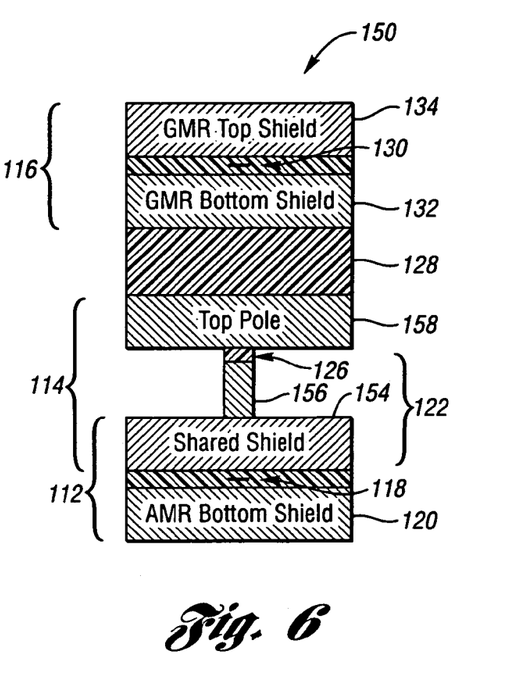
FIG. 6 illustrates a magnetic head in accordance with a sixth embodiment of the present invention.

Referring now to FIG. 6, with continual reference to FIGS. 2 and 5, a magnetic head 150 in accordance with a sixth embodiment of the present invention is shown. Magnetic head 150 generally includes the same elements as magnetic head 110 as shown in FIG. 5 and like elements have the same reference numerals in FIG. 6.

Magnetic head 150 differs from magnetic head 110 by having different shared shield and top pole configurations. Specifically, AMR reader 112 and writer 114 include a shared shield 122. Shared shield 122 includes a main body portion 154 and a pedestal portion 156. Main body portion 154 is identical to shared shield 122 of magnetic head 110 and serves as a top shield for AMR sensor 118. Pedestal portion 156 is formed on main body portion 154 and serves as a bottom pole for writer 114. Pedestal portion 156 has a width at the air-bearing surface which defines the recording track width in the media.

Writer 114 includes a top pole 158 separated at the air-bearing surface by write gap layer 126. At the air-bearing surface, top pole 158 has a width on the order of the shield widths. As such, at the air-bearing surface, top pole 158 has a width greater than the width of pedestal portion 156. As a result, pedestal portion 156 and top pole 158 of writer 114 form an inverted writer. AMR sensor 118, bottom pole pedestal 156, and GMR sensor 130 are vertically aligned with one another as shown in FIG. 6 in order to read and write data to and from media. This vertical alignment shown in FIG. 6 is by no means the only alignment possible. For example, in a helical process the writer and reader elements are offset from each other.

Figure 7:
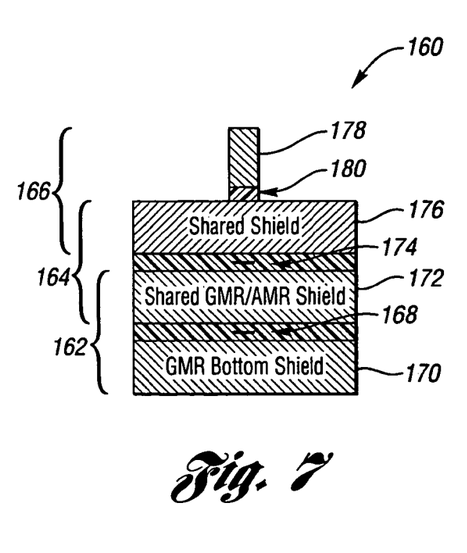
FIG. 7 illustrates a magnetic head in accordance with a seventh embodiment of the present invention.

Referring now to FIG. 7, with continual reference to FIG. 3, a magnetic head 160 in accordance with a seventh embodiment of the present invention is shown. Magnetic head 160 generally includes a GMR reader 162, an AMR reader 164, and an inductive-type writer 166.

GMR reader 162, which is deposited on a substrate (not shown), includes a GMR sensor 168 sandwiched between a GMR bottom shield 170 and a shared GMR/AMR shield 172. GMR sensor 168 is buried within a shield film gap. Shared GMR/AMR shield 172 serves as the top shield for GMR sensor 168. AMR reader 164, which is deposited on GMR reader 162, includes an AMR sensor 174 sandwiched between shared GMR/AMR shield 172 and a shared shield 176. Shared GMR/AMR shield 172 serves as the bottom shield for AMR sensor 174 and shared shield 176 serves as the top shield for the AMR sensor. Writer 166, which is deposited on AMR reader 164, includes a top pole 178 separated at the air-bearing surface from shared shield 176 by a write gap layer 180. Shared shield 176 serves as the bottom pole for writer 166. Away from the air-bearing surface, top pole 178 and shared shield 176 are magnetically coupled to one another for enabling writer 166 to write data onto the media.

Figure 8:
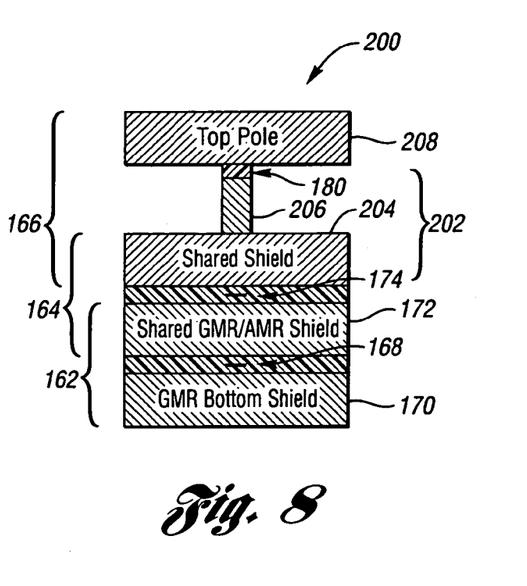
FIG. 8 illustrates a magnetic head in accordance with an eighth embodiment of the present invention.

Referring now to FIG. 8, with continual reference to FIGS. 4 and 7, a magnetic head 200 in accordance with an eighth embodiment of the present invention is shown. Magnetic head 200 generally includes the same elements as magnetic head 160 as shown in FIG. 7 and like elements have the same reference numerals in FIG. 8.

Magnetic head 200 differs from magnetic head 160 by having different shared shield and top pole configurations. Specifically, AMR reader 164 and writer 166 include shared shield 202. Shared shield 202 includes a main body portion 204 and a pedestal portion 206. Main body portion 204 is identical to shared shield 176 of magnetic head 160 and serves as a top shield for AMR sensor 174. Pedestal portion 206 is formed on main body portion 204 and serves as a bottom pole for writer 166. Pedestal portion 206 has a width at the air-bearing surface which defines the recording track width in the media.

Writer 166 of magnetic head 200 includes a top pole 208. Top pole 208 is separated at the air-bearing surface from pedestal portion 206 by write gap layer 180. At the air-bearing surface, top pole 208 has a width on the order of the shield widths. As such, at the air-bearing surface, top pole 208 has a width greater than the width of pedestal portion 206. As a result, pedestal portion 206 and top pole 208 of writer 166 form an inverted writer. GMR sensor 168, AMR sensor 174, and bottom pole pedestal 206 are vertically aligned with one another as shown in FIG. 8 in order to read and write data to and from media. This vertical alignment shown in FIG. 8 is by no means the only alignment possible. For example, in a helical process the writer and reader elements are offset from each other.

Figure 9:
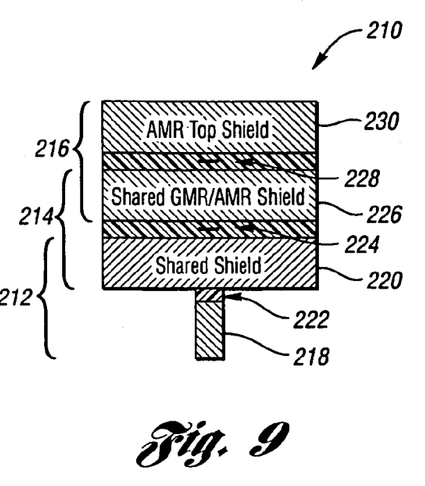
FIG. 9 illustrates a magnetic head in accordance with a ninth embodiment of the present invention.

Referring now to FIG. 9, a magnetic head 210 in accordance with a ninth embodiment of the present invention is shown. FIG. 9 illustrates a cross-sectional view of magnetic head 210 parallel to an air-bearing surface which faces a media. Magnetic head 210 includes an inductive-type writer 212, a GMR reader 214, and an AMR reader 216. Writer 212, GMR reader 214, and AMR reader 216 are supported on a substrate (not shown) in a stacked fashion.

Writer 212, which is deposited on a substrate (not shown), includes a bottom pole 218 separated at the air-bearing surface from a shared shield 220 by a write gap layer 222. Shared shield 220 serves as the top pole for writer 212. Away from the air-bearing surface, bottom pole 218 and shared shield 220 are magnetically coupled to one another for enabling writer 212 to write data onto the media.

GMR reader 214, which is deposited on writer 212, includes a GMR sensor 224 sandwiched between shared shield 220 and a shared GMR/AMR shield 226. Shared shield 220 serves as the bottom shield for GMR sensor 224 and shared GMR/AMR shield 226 serves as the top shield for GMR sensor 224. AMR reader 216, which is deposited on GMR reader 214, includes an AMR sensor 228 sandwiched between shared GMR/AMR shield 226 and an AMR top shield 230. Shared GMR/AMR shield 226 serves as the bottom shield for AMR sensor 228. It is noted that shared shield 220 as shown in FIG. 9 may be difficult to fabricate in practice. As such, shared shield 220 could be broken up into a writer shield and a separate GMR shield with a non-magnetic spacer interposed between these two elements.

In a manufacturing method of magnetic head 210, the elements of writer 212 are initially deposited on a substrate, followed by the deposition of the elements of GMR reader 214 onto the writer, followed by the deposition of the elements of AMR reader 216 onto the GMR reader.

To form writer 212, bottom pole 218 made of a magnetic material is selectively formed on a substrate (not shown). At the air-bearing surface, bottom pole 218 has a width as shown in FIG. 9 which defines the recording track width. Write gap layer 222 is then deposited on bottom pole 218. Coils (not shown) are then formed on write gap layer 222 away from the air-bearing surface. Write gap layer 222 is then selectively etched away from the air-bearing surface to form a magnetic path between bottom pole 218 and shared shield 220.

Shared shield 220 made of a magnetic material is then selectively formed on write gap layer 222 and the coils. Shared shield 220 functions as the top pole for writer 212. Bottom pole 218 contacts shared shield 220 at a point away from the air-bearing surface to be magnetically coupled to the shared shield.

As indicated above, to form GMR reader 214, shared shield 220 serves as a GMR bottom shield. A shield gap film (not shown) is then deposited on shared shield 220. A GMR film is formed on this shield gap film to form GMR sensor 224. Next, after forming a lead layer (not shown) as an extraction electrode which is electrically connected to GMR sensor 224, another shield gap film (not shown) is formed on the lead layer, the first shield gap film, and the GMR sensor. As such, GMR sensor 224 is buried between shield gap films. A magnetic material is then formed on the second shield gap film to form shared GMR/AMR shield 226. Shared GMR/AMR shield 226 serves as a GMR top shield.

As indicated above, to form AMR reader 216, shared GMR/AMR shield 226 serves as an AMR bottom shield. A shield gap film (not shown) is then deposited on shared GMR/AMR shield 226. An AMR film is then formed on this shield gap film to form AMR sensor 228. Next, after forming a lead layer (not shown) as an extraction electrode which is electrically connected to AMR sensor 228, a second shield gap film (not shown) is formed on the lead layer, the first shield gap film, and the AMR sensor. As such, AMR sensor 228 is buried between the shield gap films. Further, AMR top shield 230 made of a magnetic material is selectively formed on the second shield gap film.

Bottom pole 218, GMR sensor 224, and AMR sensor 228 are vertically aligned with one another as shown in FIG. 9. This vertical alignment shown in FIG. 9 is by no means the only alignment possible. For example, in a helical process the writer and reader elements are offset from each other. As such, GMR sensor 224 and AMR sensor 228 are aligned to read data. In the case of GMR sensor 224, "low flux" media is suitable to be sensed by the GMR sensor. In the case of AMR sensor 228, "high flux" media is suitable to be sensed by the AMR sensor.

Further, magnetic head 210 represents an inverted stacking compared with the stacking of magnetic head 60 shown in FIG. 3. The stacking of magnetic head 210 enables the patterning of bottom pole 218 of writer 212 to be done early in the manufacturing process as compared to patterning top pole 78 of magnetic head 60 later in the manufacturing process.

Figure 10:
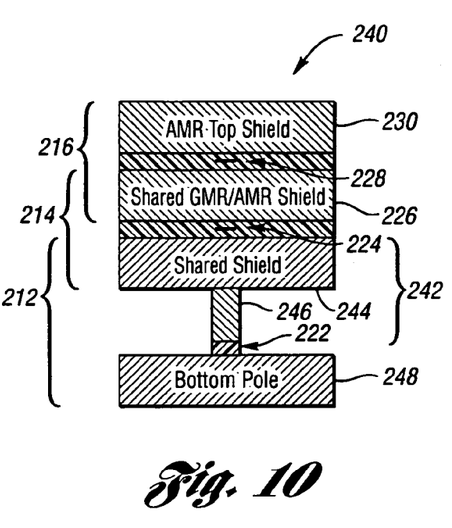
FIG. 10 illustrates a magnetic head in accordance with a tenth embodiment of the present invention.

Referring now to FIG. 10, with continual reference to FIG. 9, a magnetic head 240 in accordance with a tenth embodiment of the present invention is shown. FIG. 10 illustrates a cross-sectional view of magnetic head 240 parallel to an air-bearing surface which faces a media. Magnetic head 240 generally includes the same elements as magnetic head 210 and like elements have the same reference numerals in FIG. 10.

Magnetic head 240 differs from magnetic head 210 by having different shared shield and top and bottom pole configurations. Specifically, writer 212 and GMR reader 214 include a shared shield 242. Shared shield 242 includes a main body portion 244 and a pedestal portion 246. Main body portion 244 is identical to shared shield 220 of magnetic head 210 and serves as a bottom shield for GMR sensor 224. Main body portion 244 is formed on pedestal portion 246 that serves as a top pole for writer 212. Pedestal portion 246 has a width at the air-bearing surface which defines the recording track width in the media.

It is noted that main body portion 244 of shared shield 242 as shown in FIG. 10 may be difficult to fabricate in practice. As such, main body portion 244 could be broken up into a writer pole and a separate GMR shield with a non-magnetic spacer interposed between these two elements.

Writer 212 further includes a bottom pole 248. Bottom pole 248 is separated at the air-bearing surface from pedestal portion 246 by write gap layer 222. At the air-bearing surface, bottom pole 248 has a width on the order of the shield widths. As such, at the air-bearing surface, bottom pole 248 has a width greater than the width of pedestal portion 246. Pedestal portion 246 of writer 212, GMR sensor 224, and AMR sensor 228 are vertically aligned with one another as shown in FIG. 10 in order to read and write data to and from media. This vertical alignment shown in FIG. 10 is by no means the only alignment possible. For example, in a helical process the writer and reader elements are offset from each other.

Two additional magnetic head embodiments can be obtained from the magnetic head embodiments shown in FIGS. 9 and 10 by interchanging the position of GMR reader 214 and AMR reader 216 as shown in FIGS. 5, 6, 7, and 8 with respect to what is shown in FIGS. 1, 2, 3, and 4.

Figure 11:
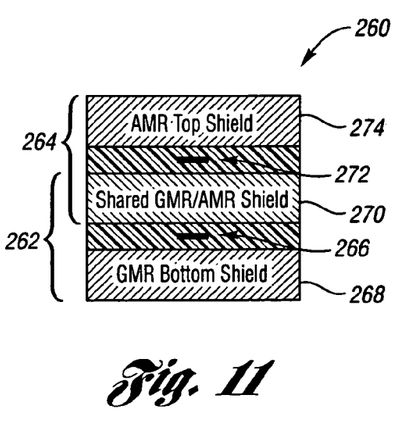
FIG. 11 illustrates a magnetic head in accordance with an eleventh embodiment of the present invention.
Figure 12:
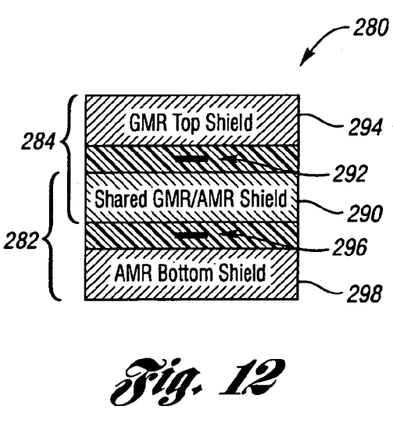
FIG. 12 illustrates a magnetic head in accordance with a twelfth embodiment of the present invention.

The embodiments of the magnetic head in accordance with the present invention have been described thus far as having two readers (i.e., an AMR reader and a GMR reader) and a writer. It is to be appreciated that the magnetic head in accordance with the present invention may only have the two readers and be void of the writer. FIGS. 11 and 12 illustrate such embodiments of the magnetic head.

Referring now to FIG. 11, with continual reference to FIG. 1, a magnetic head 260 in accordance with an eleventh embodiment of the present invention is shown. FIG. 11 illustrates a cross-sectional view of magnetic head 260 parallel to an air-bearing surface which faces a magnetic recording media such as a magnetic tape or any other removable magnetic storage media. Magnetic head 260 generally includes a GMR reader 262 and an AMR reader 264 which are supported on a substrate (not shown) in a stacked fashion.

GMR reader 262, which is deposited on a substrate, generally includes a GMR sensor 266 sandwiched between a GMR bottom shield 268 and a shared GMR/AMR shield 270. Shared GMR/AMR shield 270 serves as the top shield for GMR sensor 266. AMR reader 264, which is deposited on GMR reader 262, generally includes an AMR sensor 272 sandwiched between shared GMR/AMR shield 270 and an AMR top shield 274. Shared GMR/AMR shield 270 serves as the bottom shield for AMR sensor 272.

Referring now to FIG. 12, with continual reference to FIG. 11, a magnetic head 280 in accordance with a twelfth embodiment of the present invention is shown. FIG. 12 illustrates a cross-sectional view of magnetic head 280 parallel to an air-bearing surface which faces a magnetic recording media such as a magnetic tape or any other removable magnetic storage media. Magnetic head 280 generally includes an AMR reader 282 and a GMR reader 284 which are supported on a substrate (not shown) in a stacked fashion.

AMR reader 282, which is deposited on a substrate, generally includes an AMR sensor 296 sandwiched between an AMR bottom shield 298 and a shared GMR/AMR shield 290. Shared GMR/AMR shield 290 serves as the top shield for AMR sensor 296. GMR reader 284, which is deposited on AMR reader 282, generally includes a GMR sensor 292 sandwiched between shared GMR/AMR shield 290 and a GMR top shield 294. Shared GMR/AMR shield 290 serves as the bottom shield for GMR sensor 292.

Thus, it is apparent that there has been provided, in accordance with the present invention, a magnetic head having an AMR reader and a GMR reader supported by a substrate in a stacked fashion that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A magnetic head comprising:
a giant magneto-resistive (GMR) reader;
an anisotropic magneto-resistive (AMR) reader; and
an inductive-type writer;
wherein the GMR reader and the AMR reader are stacked on a substrate, wherein the writer is stacked with the GMR reader and the AMR reader on the substrate.

2. The magnetic head of claim 1 wherein:
the AMR reader is stacked on the writer and the writer is stacked on the GMR reader.

3. The magnetic head of claim 2 wherein:
the GMR reader includes a GMR sensor sandwiched between a GMR sensor bottom shield and a shared shield;
wherein the writer includes a write gap layer on the shared shield and includes a top pole on the write gap layer;
wherein the shared shield serves as a GMR sensor top shield and serves as a bottom pole for the writer;
wherein the AMR reader includes an AMR sensor sandwiched between an AMR sensor bottom shield and an AMR sensor top shield, wherein an insulating gap layer separates the AMR sensor bottom shield from the top pole of the writer.

4. The magnetic head of claim 2 wherein:
the GMR reader includes a GMR sensor sandwiched between a GMR sensor bottom shield and a shared shield, wherein the shared shield includes a main body portion and a pedestal portion formed on top of the main body portion, wherein the main body portion serves as a GMR sensor top shield;
wherein the writer includes a write gap layer on the pedestal portion and includes a top pole on the write gap layer, wherein the pedestal portion serves as a bottom pole for the writer;
wherein the AMR reader includes an AMR sensor sandwiched between an AMR sensor bottom shield and an AMR sensor top shield, wherein an insulating gap layer separates the AMR sensor bottom shield from the top pole of the writer.

5. The magnetic head of claim 1 wherein:
the GMR reader is stacked on the writer and the writer is stacked on the AMR reader.

6. The magnetic head of claim 5 wherein:
the AMR reader includes an AMR sensor sandwiched between an AMR sensor bottom shield and a shared shield;
wherein the writer includes a write gap layer on the shared shield and includes a top pole on the write gap layer;
wherein the shared shield serves as an AMR sensor top shield and serves as a bottom pole for the writer;
wherein the GMR reader includes a GMR sensor sandwiched between a GMR sensor bottom shield and a GMR sensor top shield, wherein an insulating gap layer separates the GMR sensor bottom shield from the top pole of the writer.

7. The magnetic head of claim 5 wherein:
the AMR reader includes an AMR sensor sandwiched between an AMR sensor bottom shield and a shared shield, wherein the shared shield includes a main body portion and a pedestal portion formed on top of the main body portion, wherein the main body portion serves as an AMR sensor top shield;
wherein the writer includes a write gap layer on the pedestal portion and includes a top pole on the write gap layer, wherein the pedestal portion serves as a bottom pole for the writer;
wherein the GMR reader includes a GMR sensor sandwiched between a GMR sensor bottom shield and a GMR sensor top shield, wherein an insulating gap layer separates the GMR sensor bottom shield from the top pole of the writer.

8. The magnetic head of claim 1 wherein:
the writer is stacked on the GMR reader and the GMR reader is stacked on the AMR reader.

9. The magnetic head of claim 8 wherein:
the AMR reader includes an AMR sensor sandwiched between an AMR sensor bottom shield and a shared sensor shield, wherein the shared sensor shield serves as an AMR sensor top shield;
the GMR reader includes a GMR sensor sandwiched between the shared sensor shield and a shared shield, wherein the shared sensor shield serves as a GMR sensor bottom shield and the shared shield serves as a GMR sensor top shield;
wherein the writer includes a write gap layer on the shared shield and includes a top pole on the write gap layer, wherein the shared shield serves as a bottom pole for the writer.

10. The magnetic head of claim 8 wherein:
the AMR reader includes an AMR sensor sandwiched between an AMR sensor bottom shield and a shared sensor shield, wherein the shared sensor shield serves as an AMR sensor top shield;
the GMR reader includes a GMR sensor sandwiched between the shared sensor shield and a shared shield, wherein the shared shield has a main body portion and a pedestal portion formed on top of the main body portion, wherein the main body portion serves as a GMR sensor top shield;
wherein the writer includes a write gap layer on the pedestal portion and includes a top pole on the write gap layer, wherein the pedestal portion serves as a bottom pole for the writer.

11. The magnetic head of claim 1 wherein:
the writer is stacked on the AMR reader and the AMR reader is stacked on the GMR reader.

12. The magnetic head of claim 11 wherein:
the GMR reader includes a GMR sensor sandwiched between a GMR sensor bottom shield and a shared sensor shield, wherein the shared sensor shield serves as a GMR sensor top shield;
the AMR reader includes an AMR sensor sandwiched between the shared sensor shield and a shared shield, wherein the shared sensor shield serves as an AMR sensor bottom shield and the shared shield serves as an AMR sensor top shield;

wherein the writer includes a write gap layer on the shared shield and includes a top pole on the write gap layer, wherein the shared shield serves as a bottom pole for the writer.

13. The magnetic head of claim 11 wherein:
the GMR reader includes a GMR sensor sandwiched between a GMR sensor bottom shield and a shared sensor shield, wherein the shared sensor shield serves as a GMR sensor top shield;
the AMR reader includes an AMR sensor sandwiched between the shared sensor shield and a shared shield, wherein the shared shield has a main body portion and a pedestal portion formed on top of the main body portion, wherein the main body portion serves as an AMR sensor top shield;
wherein the writer includes a write gap layer on the pedestal portion and includes a top pole on the write gap layer, wherein the pedestal portion serves as a bottom pole for the writer.

14. The magnetic head of claim 1 wherein:
the AMR reader is stacked on the GMR reader and the GMR reader is stacked on the writer.

15. The magnetic head of claim 14 wherein:
the writer includes a bottom pole separated by a write gap layer from a shared shield, wherein the shared shield serves as a top pole for the writer;
the GMR reader includes a GMR sensor sandwiched between the shared shield and a shared sensor shield, wherein the shared shield serves as a GMR sensor bottom shield and the shared sensor shield serves as a GMR sensor top shield;
the AMR reader includes an AMR sensor sandwiched between the shared sensor shield and an AMR sensor top shield, wherein the shared sensor shield serves as an AMR sensor bottom shield.

16. The magnetic head of claim 15 wherein:
the shared shield includes a pedestal portion and a main body portion formed on the pedestal portion, wherein the main body portion serves as a GMR sensor bottom shield and the pedestal portion serves as a top pole for the writer.

17. The magnetic head of claim 1 wherein:
the GMR reader is stacked on the AMR reader and the AMR reader is stacked on the writer.

18. The magnetic head of claim 17 wherein:
the writer includes a bottom pole separated by a write gap layer from a shared shield, wherein the shared shield serves as a top pole for the writer;
the AMR reader includes an AMR sensor sandwiched between the shared shield and a shared sensor shield, wherein the shared shield serves as an AMR sensor bottom shield and the shared sensor shield serves as an AMR sensor top shield;
the GMR reader includes a GMR sensor sandwiched between the shared sensor shield and a GMR sensor top shield, wherein the shared sensor shield serves as a GMR sensor bottom shield.

19. The magnetic head of claim 18 wherein:
the shared shield includes a pedestal portion and a main body portion formed on the pedestal portion, wherein the main body portion serves as an AMR sensor bottom shield and the pedestal portion serves as a top pole for the writer.

* * * * *